(12) United States Patent
Sugiyama et al.

(10) Patent No.: US 7,372,489 B2
(45) Date of Patent: May 13, 2008

(54) SIGNAL PROCESSING CIRCUIT AND SOLID-STATE IMAGE PICKUP DEVICE

(75) Inventors: Yukinobu Sugiyama, Hamamatsu (JP); Seiichiro Mizuno, Hamamatsu (JP); Tetsuya Taka, Hamamatsu (JP); Takashi Suzuki, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 600 days.

(21) Appl. No.: 10/479,241

(22) PCT Filed: May 15, 2002

(86) PCT No.: PCT/JP02/04689

§ 371 (c)(1),
(2), (4) Date: Jul. 1, 2004

(87) PCT Pub. No.: WO02/098125

PCT Pub. Date: Dec. 5, 2002

(65) Prior Publication Data

US 2004/0239788 A1    Dec. 2, 2004

(30) Foreign Application Priority Data

May 29, 2001   (JP)   ............................. 2001-160735

(51) Int. Cl.
*H04N 3/14*     (2006.01)
*H04N 5/335*    (2006.01)

(52) U.S. Cl. .................... 348/302; 348/222.1; 348/310
(58) Field of Classification Search ............... 323/265, 323/359; 348/222.1, 302
See application file for complete search history.

(56) References Cited

U.S. PATENT DOCUMENTS 4,349,777 A * 9/1982 Mitamura .................... 323/226
6,377,113 B1 * 4/2002 Kanno ........................ 327/543
6,570,371 B1 * 5/2003 Volk ........................... 323/315

FOREIGN PATENT DOCUMENTS

| JP | 62-34066 | 2/1987 |
| JP | 7-236091 | 9/1995 |
| JP | 10-107557 | 4/1998 |
| JP | 10-126696 | 5/1998 |
| JP | 2000-270154 | 9/2000 |

\* cited by examiner

*Primary Examiner*—Ngoc-Yen Vu
*Assistant Examiner*—David Holt
(74) *Attorney, Agent, or Firm*—Drinker Biddle & Reath LLP (57) ABSTRACT

A VI conversion circuit $40_n$ inputs a voltage output from a hold circuit $30_n$, converts this input voltage to a current based on the resistance value of a resistor $R_{40}$, and outputs this current from a drain terminal of a MOS transistor $T_{40}$. An amp $A_{40}$ has an adequate open loop gain and MOS transistor $T_{40}$ operates in the saturated region. Here, if the resistance value of resistor $R_{40}$ is R, the current value I that is output from VI conversion circuit $40_n$ is in the proportional relationship expressed by the equation, "I=V/R," with respect to the voltage V input into VI conversion circuit $40_n$.

3 Claims, 6 Drawing Sheets

SIGNAL PROCESSING CIRCUIT AND SOLID-STATE IMAGE PICKUP DEVICE

FIELD OF THE ART

This invention concerns a solid-state image pickup device for taking a one-dimensional or two-dimensional optical image.

BACKGROUND ART

A solid-state image pickup device has photosensitive elements aligned in one dimension or two dimensions and can take a one-dimensional or two-dimensional optical image by converting the intensity of light that is incident on each of the photosensitive elements to an electrical signal and outputting this electrical signal. A solid-state image pickup device is used, for example, in a facsimile machine to read an image on a manuscript or to take an image formed by X-rays that have been transmitted through an inspected object in a non-destructive X-ray inspection device. It is demanded that such a solid-state image pickup device takes an image with high speed.

For example, a solid-state image pickup device disclosed in Japanese Unexamined Patent Publication No. Hei-10-126696 comprises: a photoelectric conversion circuit, converting an optical signal to a voltage and outputting this voltage; a VI conversion circuit, converting the voltage output from the photoelectric conversion circuit to a current and outputting this current; and an IV conversion circuit, converting the current output by the VI conversion circuit to a voltage and outputting this voltage. The respective output terminals of a plurality of VI conversion circuits are selectively and successively connected to a single IV conversion circuit.

With a solid-state image pickup device arranged thus, current is transmitted from a VI conversion circuit disposed at a prior stage to the IV conversion circuit disposed at a subsequent stage and the potential at the input terminal of the IV conversion circuit at the subsequent stage is fixed. Thus with this solid-state image pickup device, even if the parasitic capacitance across the respective output terminals of the plurality of VI conversion circuits and the input terminal of the IV conversion circuit is large, the processing of signals among these components can be performed at high speed and image taking can thus be performed at high speed.

DISCLOSURE OF THE INVENTION

With the solid-state image pickup device disclosed in the above-mentioned Publication, each of the plurality of VI conversion circuits and the IV conversion circuit includes a MOS (Metal-Oxide-Semiconductor) type field effect transistor (FET), and it is required that all of these MOS transistors be the same in characteristics. Also with this solid-state image pickup device, each of the plurality of VI conversion circuits and the IV conversion circuit includes a constant current supply, and it is required that all of these constant current supplies be the same in characteristics.

However, even in a case where the MOS transistors that are respectively included in the plurality of VI conversion circuits and the IV conversion circuit are formed on the same substrate, the characteristics (for example, the threshold voltages) of the MOS transistors will not actually be the same. Thus even if light of the same intensity is incident on each of the photosensitive elements aligned in one dimension or two dimensions, the pixel output value (the voltage output from the IV conversion circuit) corresponding to each photosensitive element will not be the same. Also, in a case where the constant current supplies included in the plurality of VI conversion circuits and the IV conversion circuit are not the same in characteristics, the sensitivities of the respective pixels will not be the same and the linearity of the output voltage with respect to the incident light intensity will be poor. Thus with the solid-state image pickup device disclosed in the above-mentioned Publication, the image quality of the taken image is poor due to the fluctuation of the characteristics.

This invention has been made to resolve the above problem and an object thereof is to provide a solid-state image pickup device that can take images of excellent image quality at high speed and a signal processing circuit that is favorably used in such a solid-state image pickup device.

The signal processing circuit of the present invention comprises: (1) a plurality of VI conversion circuits, including each one resistor, converting an input voltage to a current based on the resistance value of the resistor, and outputting this current from an output terminal; (2) an IV conversion circuit, inputting, into an input terminal, the current output from the output terminal of the VI conversion circuit, converting this current to a voltage, and outputting this voltage; and (3) a selection circuit, successively selecting each of the output terminals of a plurality of VI conversion circuits and connecting the selected output terminal to the input terminal of the IV conversion circuit.

The solid-state image pickup device of the present invention is characterized in including the signal processing circuit by the above-described invention. That is, this invention's solid-state image pickup device comprises: (1) a plurality of photoelectric conversion circuits, outputting a voltage of a value corresponding to an incident light intensity; (2) a plurality of VI conversion circuits, including each one resistor, converting the voltage output from the photoelectric conversion circuit to a current based on the resistance value of the resistor, and outputting this current from an output terminal; (3) an IV conversion circuit, inputting, into an input terminal, the current output from the output terminal of the VI conversion circuit, converting this current to a voltage, and outputting this voltage; and (4) a selection circuit, successively selecting each of the output terminals of a plurality of VI conversion circuits and connecting the selected output terminal to the input terminal of the IV conversion circuit.

With this invention, a voltage of a value corresponding to an incident light intensity is output from the photoelectric conversion circuit. This voltage is converted to a current based on the resistance value of the resistor by the VI conversion circuit and this current is output. The current that is output from each of the plurality of VI conversion circuits is then selected successively and input into the IV conversion circuit by the selection circuit, converted into a voltage by the IV conversion circuit, and this voltage is output as a video signal.

Also, in the solid-state image pickup device of the present invention, the VI conversion circuit preferably comprises: (1) an amp, having a first input terminal, a second input terminal, and an output terminal and inputting the voltage output from the photoelectric conversion circuit into the first input terminal and outputting, from the output terminal, a voltage corresponding to the difference in the respective potentials of the first input terminal and the second input terminal; (2) a MOS transistor, having a gate terminal, source terminal, and a drain terminal, the gate terminal being connected to the output terminal of the amp; (3) a resistor, one end of which is connected to the second input terminal of the amp and the source terminal of the MOS transistor and the other end of which is connected to a first reference potential; and (4) a switch, one end of which is connected to the drain terminal of the MOS transistor and the other end of which is set to a second reference potential.

Here, the VI conversion circuit converts the voltage output from the photoelectric conversion circuit to a current and outputs this current from the drain terminal of the MOS transistor. By thus arranging the VI conversion circuit to include a resistor, the current value I output from the VI conversion circuit can be put in the proportional relationship expressed by the equation, "I=V/R," with respect to the voltage V input into the VI conversion circuit, with R being the resistance value of the resistor.

Also, in the solid-state image pickup device of the present invention, it is preferable for the amp to be put in the ON state in a period from a time that is a fixed amount of time prior to the time at which the VI conversion circuit is connected by the selection circuit to the IV conversion circuit to the time at which the connection with the IV conversion circuit is disengaged by the selection circuit and for the amp to be in the OFF state in other periods. By doing so, since the amp is put in the ON state from a time that is a fixed amount of time (for example, approximately 1 microsecond) prior to the time at which the VI conversion circuit is connected by the selection circuit to the IV conversion circuit, the operation of the VI conversion circuit in the above-mentioned period is started up early. Also since the amp of the VI conversion circuit is put in the OFF state in other periods, the consumption power is reduced.

BEST MODE FOR CARRYING OUT THE INVENTION

Embodiments of this invention shall now be described with reference to the drawings. In the description of the drawings, the same elements shall be provided with the same symbols and redundant description shall be omitted.

First Embodiment

Figure 1:
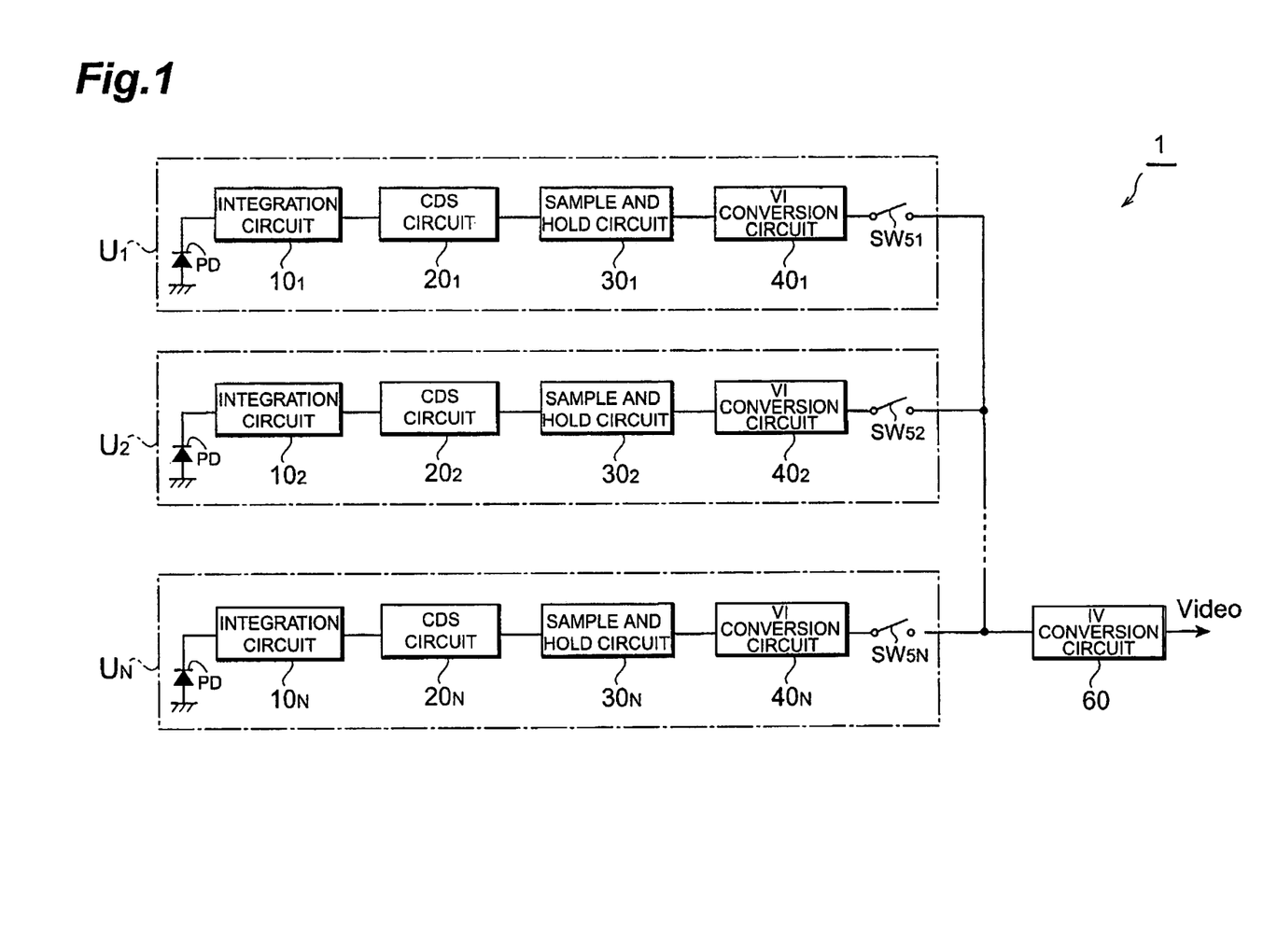
FIG. 1 is a block diagram of a solid-state image pickup device 1 of a first embodiment.

First, a first embodiment of a solid-state image pickup device by this invention shall be described. FIG. 1 is a block diagram of a solid-state image pickup device 1 of the first embodiment. This solid-state image pickup device 1 has photodiodes PD aligned in one dimension and is equipped with N (where N is an integer of 2 or more) units $U_1$ to $U_N$ and an IV conversion circuit 60. Each unit $U_n$ (where n is an arbitrary integer of no less than 1 and no more than N) includes a photodiode PD, an integrating circuit $10_n$, a CDS (Correlated Double Sampling) circuit $20_n$, a sample-and-hold (referred to hereinafter as "hold") circuit $30_n$, a VI conversion circuit $40_n$ and a switch $SW_{5n}$.

With each unit $U_n$, photodiode PD, integrating circuit $10_n$, CDS circuit $20_n$, and hold circuit $30_n$ make up a photoelectric conversion circuit that outputs a voltage of a value corresponding to an incident light intensity. The N switches $SW_{51}$ to $SW_{5N}$ make up a selection circuit that successively selects the output terminal of VI conversion circuit $40_n$, of each unit $U_n$ and connects the output terminal to the input terminal of IV conversion circuit 60. Integrating circuit $10_n$, CDS circuit $20_n$, hold circuit $30_n$, and VI conversion circuit $40_n$ of each unit $U_n$ and IV conversion circuit 60 make up a signal processing circuit of this solid-state image pickup device 1.

Figure 2:
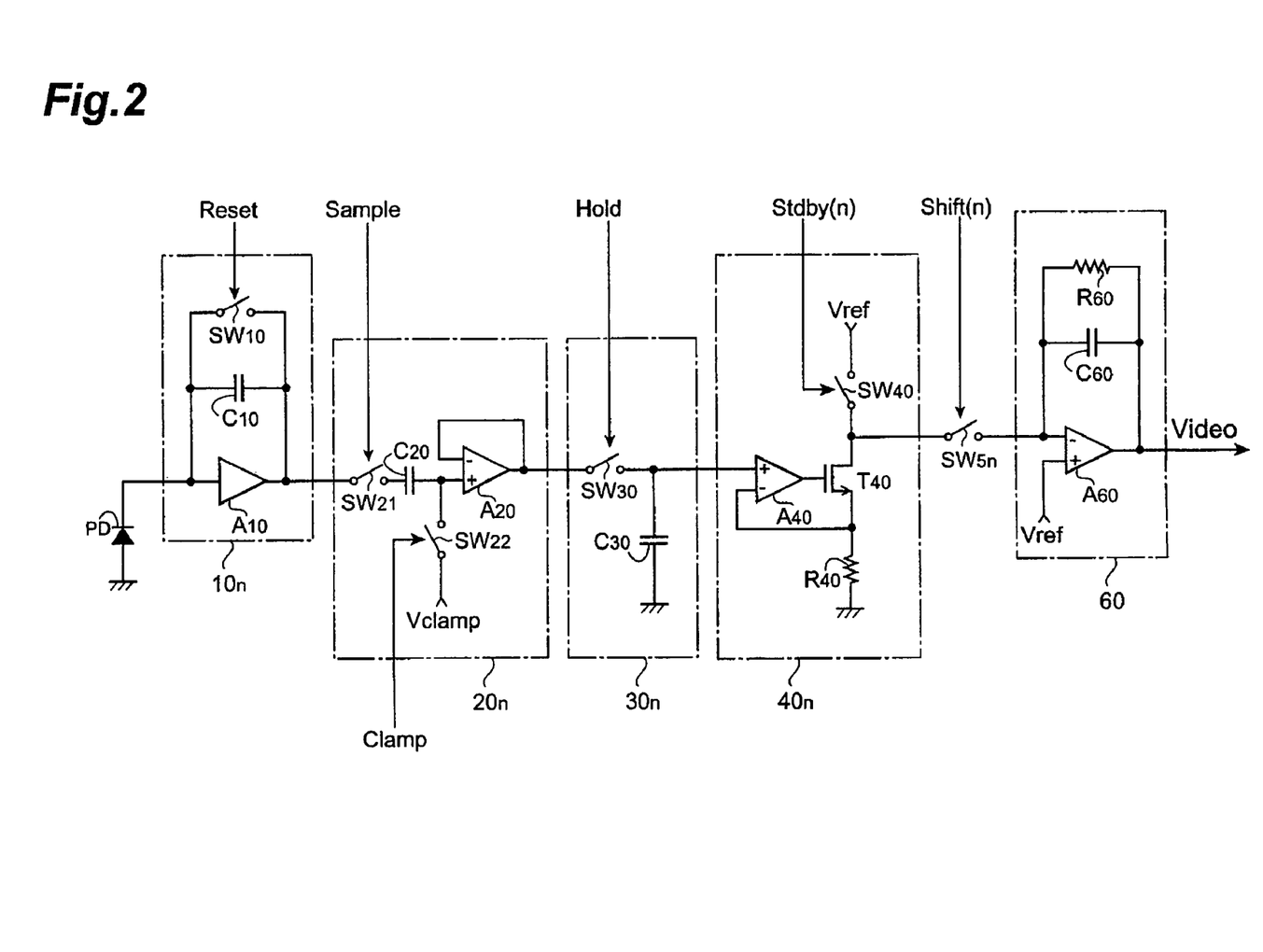
FIG. 2 is a specific circuit diagram of solid-state image pickup device 1 of the first embodiment.
Figure 3A:
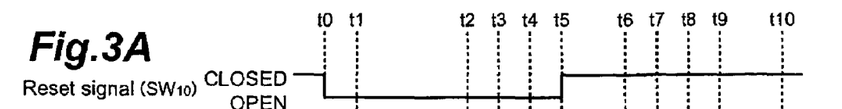
FIGS. 3A, 3B, 3C, 3D, 3E, 3F, 3G, 3H, 3I, 3J, and 3K are timing charts for explaining the operations of solid-state image pickup device 1 of the first embodiment.
Figure 3B:
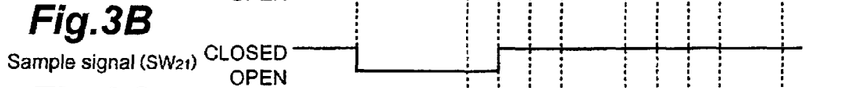
Figure 3C:
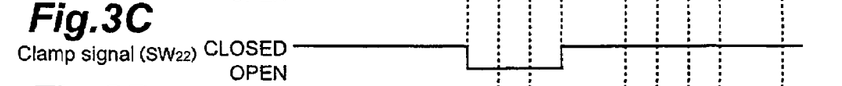
Figure 3D:
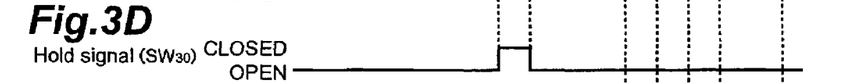
Figure 3E:
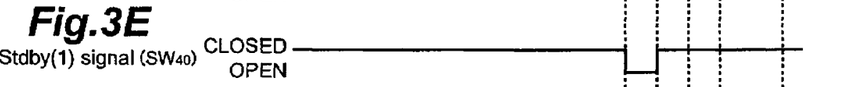
Figure 3F:
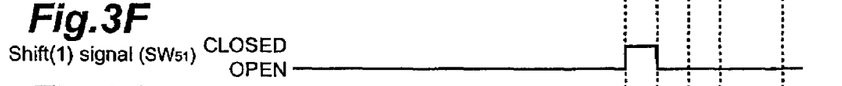
Figure 3G:
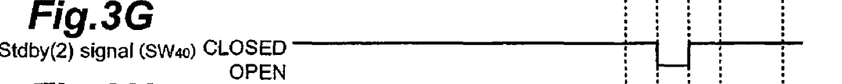
Figure 3H:
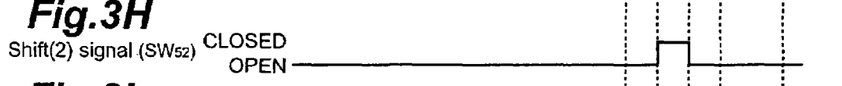
Figure 3I:
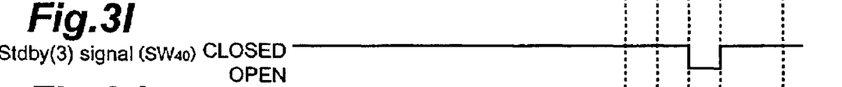
Figure 3J:
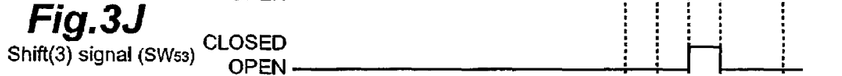
Figure 3K:
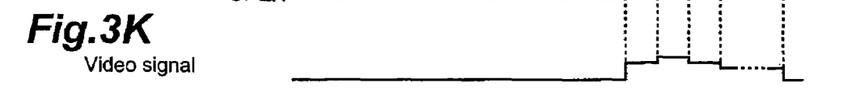

FIG. 2 is a specific circuit diagram of solid-state image pickup device 1 of the first embodiment. In this Figure, just one unit $U_n$, among the N units $U_1$ to $U_N$, is shown. With photodiode PD of each unit $U_n$, the anode terminal is grounded and the cathode terminal is connected to the input terminal of integrating circuit $10_n$. This photodiode PD outputs charges of an amount corresponding to an input light intensity to integrating circuit $10_n$.

Integrating circuit $10_n$ of each unit $U_n$ comprises an amp $A_{10}$, a switch $SW_{10}$, and a capacitor $C_{10}$. The input terminal of amp $A_{10}$, is connected to the cathode terminal of photodiode PD and the output terminal of amp $A_{10}$ is connected to CDS circuit $20_n$. Switch $SW_{10}$ and capacitor $C_{10}$ are disposed in parallel between the input terminal and the output terminal of amp $A_{10}$. Switch $SW_{10}$ discharges the charges accumulated in capacitor $C_{10}$ and resets the output level when it is closed, and causes the charges input from photodiode PD to accumulate in capacitor $C_{10}$ when it is open. Integrating circuit $10_n$ outputs a voltage of a value corresponding to the amount of charges accumulated in capacitor $C_{10}$. The switching operations of switch $SW_{10}$ are controlled by a Reset signal.

CDS circuit $20_n$ of each unit $U_n$ comprises an amp $A_{20}$, a switch $SW_{21}$, a switch $SW_{22}$, and a capacitor $C_{20}$. The inverted input terminal of amp $A_{20}$ is connected to the output terminal of amp $A_{20}$. The non-inverted input terminal of amp $A_{20}$ is connected serially via switch $SW_{21}$ and capacitor $C_{20}$ to integrating circuit 10 and is connected via switch $SW_{22}$ to a clamp potential $V_{clamp}$. By the opening and closing of switch $SW_{21}$ and switch $SW_{22}$ being carried out at appropriate timings, CDS circuit $20_n$ outputs the difference voltage $(V(t)-(Vt_1))$ between a voltage $V(t_1)$ at a predetermined time $t_1$ and a voltage $V(t)$ at each time t, which are output from integrating circuit $10_n$. The switching operations of switch $SW_{21}$ are controlled by a Sample signal and the switching operations of switch $SW_{22}$ are controlled by a Clamp signal.

Hold circuit $30_n$ of each unit $U_n$ comprises a switch $SW_{30}$ and a capacitor $C_{30}$. Switch $SW_{30}$ has one end connected to CDS circuit $20_n$ and has the other end connected to one end of capacitor $C_{30}$ and to VI conversion circuit $40_n$. The other end of capacitor $C_{30}$ is set to the ground potential. Hold circuit $30_n$ holds the voltage input from CDS circuit $20_n$ in capacitor $C_{30}$ when switch $SW_{30}$ is closed and outputs the voltage held in capacitor $C_{30}$ when switch $SW_{30}$ is open. The switching operations of switch $SW_{30}$ are controlled by a Hold signal.

VI conversion circuit $40_n$ of each unit $U_n$ comprises an amp $A_{40}$, a switch $SW_{40}$, a MOS transistor $T_{40}$, and a resistor $R_{40}$. Amp $A_{40}$ has its non-inverted input terminal connected to hold circuit $30_n$ and has its inverted input terminal connected to the source terminal of MOS transistor $T_{40}$ and to one end of resistor $R_{40}$. The other end of resistor $R_{40}$ is set to the ground potential. MOS transistor $T_{40}$ has its gate electrode connected to the output terminal of amp $A_{40}$ and has its drain terminal connected via switch $SW_{40}$ to a reference potential $V_{ref}$. VI conversion circuit $40_n$ inputs the voltage output from hold circuit $30_n$, converts this input voltage to a current based on the resistance value of resistor $R_{40}$, and outputs this current from the drain terminal of MOS transistor $T_{40}$. The switching operations of switch $SW_{40}$ of VI conversion circuit $40_n$ are controlled by a Stdby(n) signal.

By successive closing of switch $SW_{5n}$ of each unit $U_n$, the output terminal of VI conversion circuit $40_n$ of each unit $U_n$ is connected successively to the input terminal of IV conversion circuit $60$. The switching operations of switch $SW_{5n}$ are controlled by a Shift(n) signal.

IV conversion circuit $60$ comprises an amp $A_{60}$, a resistor $R_{60}$, and a capacitor $C_{60}$. Amp $A_{60}$ has its inverted input terminal connected via switch $SW_{5n}$ to the output terminal of VI conversion circuit $40_n$ and has its non-inverted input terminal set to reference potential $V_{ref}$. Resistor $R_{60}$ and capacitor $C_{60}$ are respectively disposed in parallel between the inverted input terminal and the output terminal of amp $A_{60}$. IV conversion circuit $60$ inputs the current output from the output terminal of VI conversion circuit $40_n$, converts this current to a voltage, and outputs this voltage (Video signal) from the output terminal of amp $A_{60}$.

Integrated circuit $10_n$, CDS circuit $20_n$, and hold circuit $30_n$ respectively operate in parallel in each unit $U_n$. The Reset signal that controls the switching operations of switch $SW_{10}$ of each integrating circuit $10_n$, the Sample signal that controls the switching operations of switch $SW_2$, of each CDS circuit $20_n$, the Clamp signal that controls the switching operations of switch $SW_{22}$ of each CDS circuit $20_n$, the Hold signal that controls the switching operations of switch $SW_{30}$ of each hold circuit $30_n$, the Stdby(n) signal that controls the switching operations of switch $SW_{40}$ of each VI conversion circuit $40_n$, and the Shift (n) signal that controls the switching operations of switch $SW_{5n}$ are output respectively at predetermined timings by a control circuit (not shown).

FIGS. 3A, 3B, 3C, 3D, 3E, 3F, 3G, 3H, 3I, 3J, and 3K are timing charts for explaining the operations of solid-state image pickup device $1$ of the first embodiment. First, the Reset signal is set to the H level, causing switch $SW_{10}$ of each integrating circuit $10_n$ to close and the output level of each integrating circuit $10_n$ to be reset. Thereafter, the Reset signal changes to the L level at time to, causing switch $SW_{10}$ of each integrating circuit $10_n$ to open and the accumulation of charge in capacitor $C_{10}$ of each integrating circuit $10_n$ to be started.

At time $t_1$, the Sample signal changes from the H level to the L level and switch $SW_{21}$ of each CDS circuit $20$, opens. At time $t_2$, the Clamp signal changes from the H level to the L level and switch $SW_{22}$ of each CDS circuit $20_n$ opens. At time $t_3$, the Sample signal changes from the L level to the H level and switch $SW_{21}$ of each CDS circuit $20_n$ closes, and the Hold signal changes from the L level to the H level and switch $SW_{30}$ of each hold circuit $30_n$ closes. At time $t_4$, the Hold signal changes from the H level to the L level and switch $SW_{30}$ of each hold circuit $30_n$ opens.

If the voltage output from integrating circuit $10_n$ at a time t is expressed as V(t), the voltage that is output from CDS circuit $20_n$ at a time t prior to the time $t_4$ is $(V(t)-V(t_1))$. From time $t_4$, at which switch $SW_{30}$ of hold circuit $30_n$ opens, and onwards, the voltage that is output from hold circuit $30_n$ is $V(t_4)-V(t_1)$. By thus taking the difference, the influence of the fluctuation of the offset of amp $A_{10}$ is eliminated. At time $t_5$, the Reset signal changes to the H level and switch $SW_{10}$ of each integrating circuit $10_n$ closes and the Clamp signal changes to the H level and switch $SW_{22}$ of each CDS circuit $20_n$ closes.

Then at time $t_6$, the Stdby(1) signal changes from the H level to the L level and switch $SW_{40}$ of VI conversion circuit $40_1$ opens and the Shift(1) signal changes from the L level to the H level and switch $SW_{51}$ closes. At time $t_7$, the Stdby(1) signal changes to the H level and switch $SW_{40}$ of VI conversion circuit $40_1$ closes and the Shift(1) signal changes to the L level and switch $SW_{51}$ opens. In the period from time $t_6$ to time $t_7$, the respective switches $SW_{40}$ of the other VI conversion circuits $40_2$ to $40_N$ are closed and the other switches $SW_{52}$ to $SW_{5N}$ are open. The voltage that is output from hold circuit $30_1$ of unit $U_1$ during this period ($t_6$ to $t_7$) is converted to a current by VI conversion circuit $40_1$, and this current is input via switch $SW_{51}$ into IV conversion circuit $60$ and converted to a voltage by IV conversion circuit $60$.

Also, at time $t_7$, the Stdby(2) signal changes from the H level to the L level and switch $SW_{40}$ of VI conversion circuit $40_2$ opens and the Shift (2) signal changes from the L level to the H level and switch $SW_{52}$ closes. At time $t_8$, the Stdby(2) signal changes to the H level and switch $SW_{40}$ of VI conversion circuit $40_2$ closes and the Shift (2) signal changes to the L level and switch $SW_{52}$ opens. In the period from time $t_7$ to time $t_8$, the respective switches $SW_{40}$ of the other VI conversion circuits $40_1$ and $40_3$ to $40_N$ are closed and the other switches $SW_{51}$ and $SW_{53}$ to $SW_{5N}$ are open. The voltage that is output from hold circuit $30_2$ of unit $U_2$ during this period ($t_7$ to $t_8$) is converted to a current by VI conversion circuit $40_2$, and this current is input via switch $SW_{52}$ into IV conversion circuit $60$ and converted to a voltage by IV conversion circuit $60$.

Furthermore, at time $t_8$, the Stdby(3) signal changes from the H level to the L level and switch $SW_{40}$ of VI conversion circuit $40_3$ opens and the Shift (3) signal changes from the L level to the H level and switch $SW_{53}$ closes. At time $t_9$, the Stdby(3) signal changes to the H level and switch $SW_{40}$ of VI conversion circuit $40_3$ closes and the Shift (3) signal changes to the L level and switch $SW_{53}$ opens. In the period from time $t_8$ to time $t_9$, the respective switches $SW_{40}$ of the other VI conversion circuits $40_1$, $40_2$, and $40_4$ to $40_N$ are closed and the other switches $SW_{51}$, $SW_{52}$, and $SW_{54}$ to $SW_{5N}$ are open. The voltage that is output from hold circuit $30_3$ of unit $U_3$ during this period ($t_8$ to $t_9$) is converted to a current by VI conversion circuit $40_3$, and this current is input via switch $SW_{53}$ into IV conversion circuit $60$ and converted to a voltage by IV conversion circuit $60$.

Thereafter the respective switching operations of switch $SW_{40}$ of each VI conversion circuit $40_n$ and each switch $SW_{5n}$ are performed in likewise manner and a Video signal is output from IV conversion circuit $60$. With this Video signal, the voltage corresponding to the intensity of incident light on photodiode PD of each unit $U_n$ appears in a time sequence.

The operations of each VI conversion circuit $40_n$ shall now be described in detail. VI conversion circuit $40_n$ has the circuit arrangement shown in FIG. 2 and inputs the voltage output from hold circuit $30_n$, converts this input voltage into a current based on the resistance value of resistor $R_{40}$, and outputs this current from the drain terminal of MOS transistor $T_{40}$. Here, amp $A_{40}$ has an adequate open loop gain and MOS transistor $T_{40}$ operates in the saturated region. Here, if the resistance value of resistor $R_{40}$ is R, the current value I that is output from VI conversion circuit $40_n$ is in the proportional relationship expressed by the equation, "I=V/R," with respect to the voltage V input into VI conversion circuit $40_n$.

As can be understood from the above, when light of the same intensity is made incident on photodiode PD of each unit $U_n$, the fluctuation of the value of the current output from each VI conversion circuit $40_n$ depends on the fluctuation of the resistance value R of resistor $R_{40}$ of each VI conversion circuit $40_n$. In general, the fluctuation in manufacture of the resistance values of resistors is small in comparison to the fluctuation in manufacture of the threshold voltages of MOS transistors. Solid-state image pickup device 1 of the present embodiment can thus take images of excellent quality at high speed in comparison to those of the prior art. Also, with solid-state image pickup device 1 of this embodiment, since the influence of the fluctuation of the offset possessed by amp $A_{10}$ of integrating circuit $10_n$ is eliminated by the provision of CDS circuit $20_n$, images of excellent quality can be taken for this reason as well.

Also with solid-state image pickup device 1 of this embodiment, since the N photodiodes PD and the other circuits are formed at mutually different areas on a substrate, the photosensitive area and interval of each of the N photodiodes PD may be set as suited to improve the aperture efficiency or the sensitivity. Though the N photodiodes PD and the other circuits may be formed on the same substrate, they may also be formed on mutually different substrates.

Second Embodiment

Figure 4:
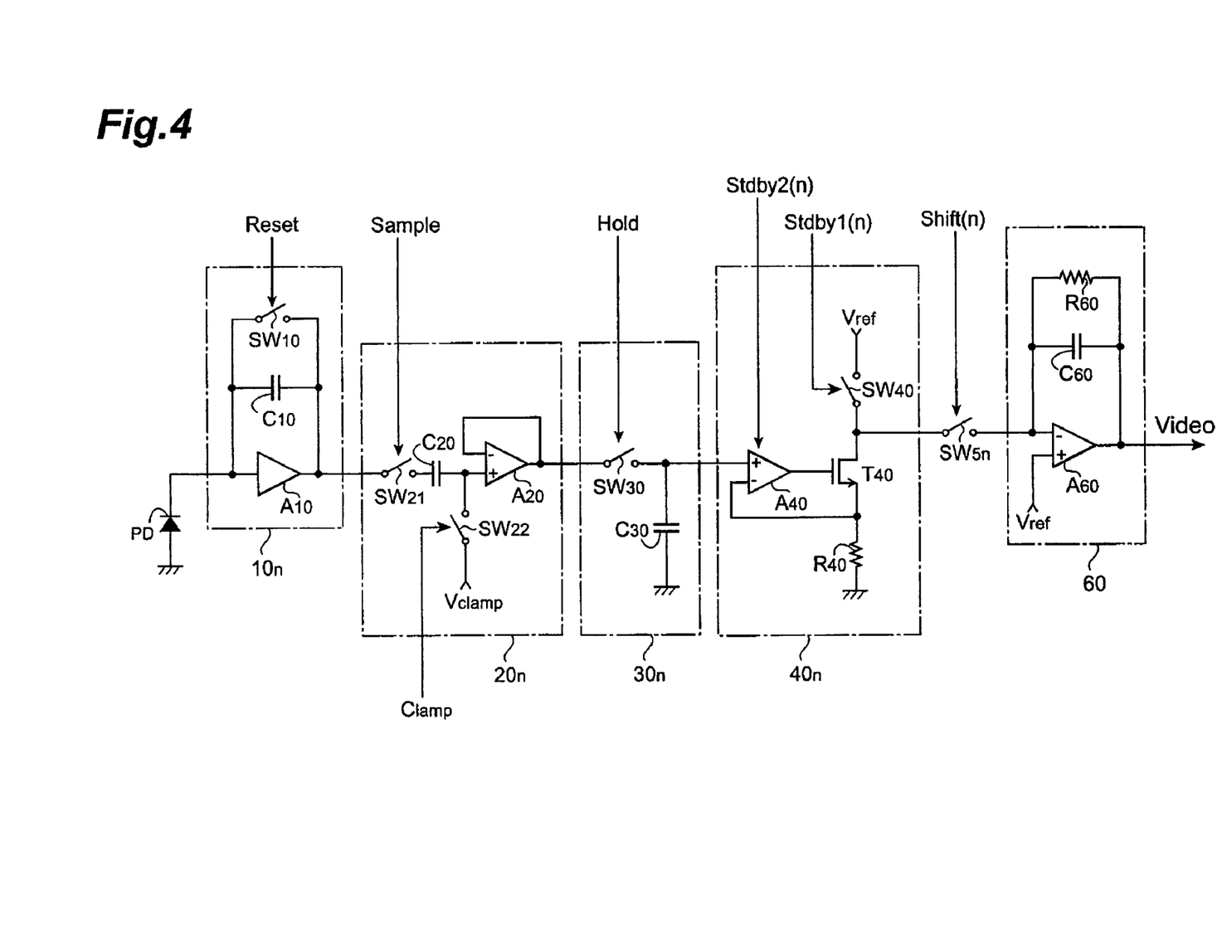
FIG. 4 is a specific circuit diagram of a solid-state image pickup device of a second embodiment.
Figure 5A:
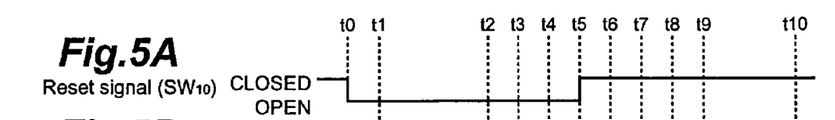
FIGS. 5A, 5B, 5C, 5D, 5E, 5F, 5G, 5H, 5I, 5J, and 5K are timing charts for explaining the operations of the solid-state image pickup device of the second embodiment.
Figure 5B:
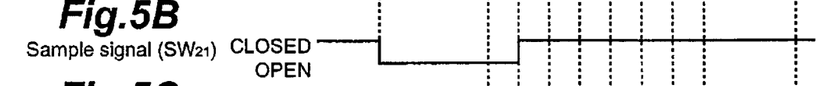
Figure 5C:
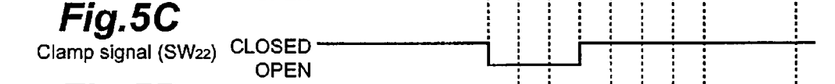
Figure 5D:
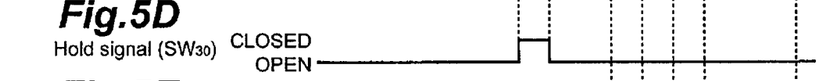
Figure 5E:
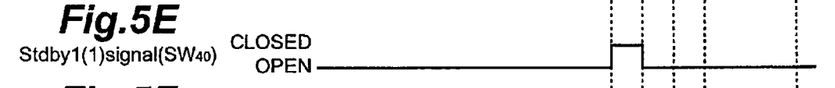
Figure 5F:
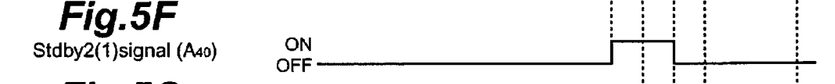
Figure 5G:
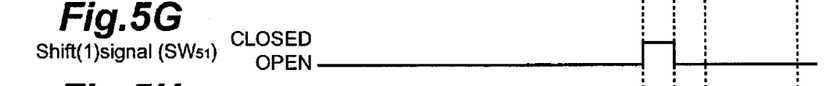
Figure 5H:
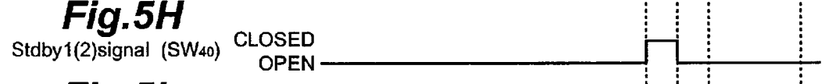
Figure 5I:
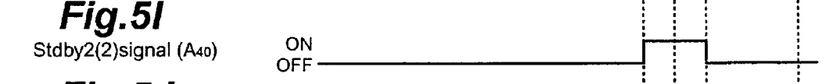
Figure 5J:
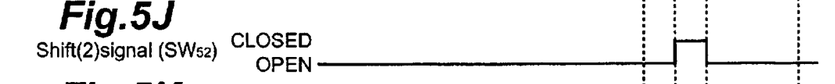
Figure 5K:
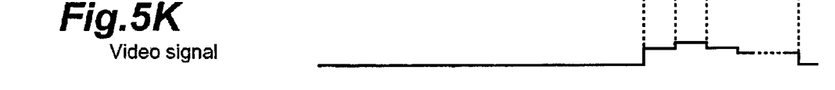

A second embodiment of a solid-state image pickup device by this invention shall now be described. The general arrangement of the solid-state image pickup device of the second embodiment is the same as that shown in FIG. 1. FIG. 4 is a specific circuit diagram of the solid-state image pickup device of the second embodiment. In comparison to the solid-state image pickup device of the first embodiment (FIG. 2), the solid-state pickup device of the second embodiment differs in that the switching operations of switch $SW_{40}$ of VI conversion circuit $40_n$ are performed according to a Stdby1(n) signal and the operation of amp $A_{40}$ of VI conversion circuit $40_n$ is switched ON/OFF by a Stdby2 (n) signal. That is, by amp $A_{40}$ of VI conversion circuit $40_n$ being put in the ON state only for a predetermined period by the Stdby2 (n) signal and being put in the OFF state in other periods, low power consumption is achieved.

FIGS. 5A, 5B, 5C, 5D, 5E, 5F, 5G, 5H, 5I, 5J, and 5K are timing charts for explaining the operations of the solid-state image pickup device of the second embodiment. The operations of the solid-state image pickup device of the second embodiment are the same as those of the first embodiment up to time $t_5$.

With the present embodiment, at time $t_6$, each of the Stdby1 (1) signal and the Stdby2 (1) signal changes from the L level to the H level and switch $SW_{40}$ of VI conversion circuit $40_1$ closes and amp $A_{40}$ of VI conversion circuit $40_1$ is put in the ON state. At time $t_7$, the Stdby1(1) signal changes to the L level and switch $SW_{40}$ of VI conversion circuit $40_1$ opens and the Shift (1) signal changes from the L level to the H level and switch $SW_{51}$ closes. At time $t_8$, each of the Stdby2(1) signal and the Shift(1) signal changes to the L level and amp $A_{40}$ of VI conversion circuit $40_1$ is put in the OFF state and switch $SW_{51}$ opens.

Thus in the period from time $t_7$ to time $t_8$, switch $SW_{40}$ of VI conversion circuit $40_1$ is open, amp $A_{40}$ of VI conversion circuit $40_1$ is in the ON state, and switch $SW_{51}$ is closed. Thus in this period from time $t_7$ to time $t_8$, the voltage that is output from hold circuit $30_1$ of unit $U_1$ is converted into a current by VI conversion circuit $40_1$, and this current is input via switch $SW_{51}$ into IV conversion circuit 60 and converted into a voltage by IV conversion circuit 60. During this period from $t_7$ to $t_8$, the other switches $SW_{52}$ to $SW_{5N}$ are respectively open.

In the prior period from time $t_6$ to time $t_7$, since switch $SW_{40}$ of VI conversion circuit $40_1$ is closed and amp $A_{40}$ of VI conversion circuit $40_1$ is in the ON state, the operation of VI conversion circuit $40_1$ in the period from $t_7$ to $t_8$ is started up early. Also, since prior to time $t_6$ and from time $t_8$ onwards, amp $A_{40}$ of VI conversion circuit $40_1$ is put in the OFF state, the consumption power is reduced. Furthermore, since prior to time $t_6$ and from time $t_7$ onwards, the Stdby1 (1) signal is at the L level and switch $SW_{40}$ of VI conversion circuit $40_1$ is open, the consumption power is reduced from this point as well.

Also, at time $t_7$, each of the Stdby1(2) signal and the Stdby2 (2) signal changes from the L level to the H level and switch $SW_{40}$ of VI conversion circuit $40_2$ closes and amp $A_{40}$ of VI conversion circuit $40_2$ is put in the ON state. At time $t_8$, the Stdby1(2) signal changes to the L level and switch $SW_{40}$ of VI conversion circuit $40_2$ opens and the Shift (2) signal changes from the L level to the H level and switch $SW_{52}$ closes. At time $t_9$, each of the Stdby2(2) signal and the Shift(2) signal changes to the L level and amp $A_{40}$ of VI conversion circuit $40_2$ is put in the OFF state and switch $SW_{52}$ opens.

Thus in the period from time $t_8$ to time $t_9$, switch $SW_{40}$ of VI conversion circuit $40_2$ is open, amp $A_{40}$ of VI conversion circuit $40_2$ is in the ON state, and switch $SW_{52}$ is closed. Thus in this period from time $t_8$ to time $t_9$, the voltage that is output from hold circuit $30_2$ of unit $U_1$ is converted into a current by VI conversion circuit $40_2$, and this current is input via switch $SW_{52}$ into IV conversion circuit 60 and converted into a voltage by IV conversion circuit 60. During this period from $t_8$ to $t_9$, the other switches $SW_{51}$ and $SW_{53}$ to $SW_{5N}$ are respectively open.

In the prior period from time $t_7$ to time $t_8$, since switch $SW_{40}$ of VI conversion circuit $40_2$ is closed and amp $A_{40}$ of VI conversion circuit $40_2$ is in the ON state, the operation of VI conversion circuit $40_2$ in the period from $t_8$ to $t_9$ is started up early. Also, since prior to time $t_7$ and from time $t_9$ onwards, amp $A_{40}$ of VI conversion circuit $40_2$ is put in the OFF state, the consumption power is reduced. Furthermore, since prior to time $t_7$ and from time $t_8$ onwards, the Stdby1 (2) signal is at the L level and switch $SW_{40}$ of VI conversion circuit $40_2$ is open, the consumption power is reduced from this point as well.

Thereafter the respective switching operations of switch $SW_{40}$ of each VI conversion circuit $40_n$ and each switch $SW_{5n}$ are performed in likewise manner and a Video signal is output from IV conversion circuit 60. With this Video signal, the voltage corresponding to the intensity of incident light on photodiode PD of each unit $U_n$ appears in a time sequence.

When light of the same intensity is made incident on photodiode PD of each unit $U_n$, the fluctuation of the value of the current output from each VI conversion circuit $40_n$ depends on the fluctuation of the resistance value R of resistor $R_{40}$ of each VI conversion circuit $40_n$ with this embodiment as well. The solid-state image pickup device of the present embodiment can thus also take images of excellent quality at high speed in comparison to those of the prior art. Also, since the influence of the fluctuation of the offset possessed by amp $A_{10}$ of integrating circuit $10_n$ is eliminated by the provision of CDS circuit $20_n$ with the solid-state image pickup device of this embodiment as well, images of excellent quality can be taken for this reason as well.

Also, since the N photodiodes PD and the other circuits are formed at mutually different areas on a substrate, the photosensitive area and interval of each of the N photodiodes PD may be set as suited to improve the aperture efficiency or the sensitivity with the solid-state image pickup device of this embodiment as well. Though the N photodiodes PD and the other circuits may be formed on the same substrate, they may also be formed on mutually different substrates.

Third Embodiment

Figure 6:
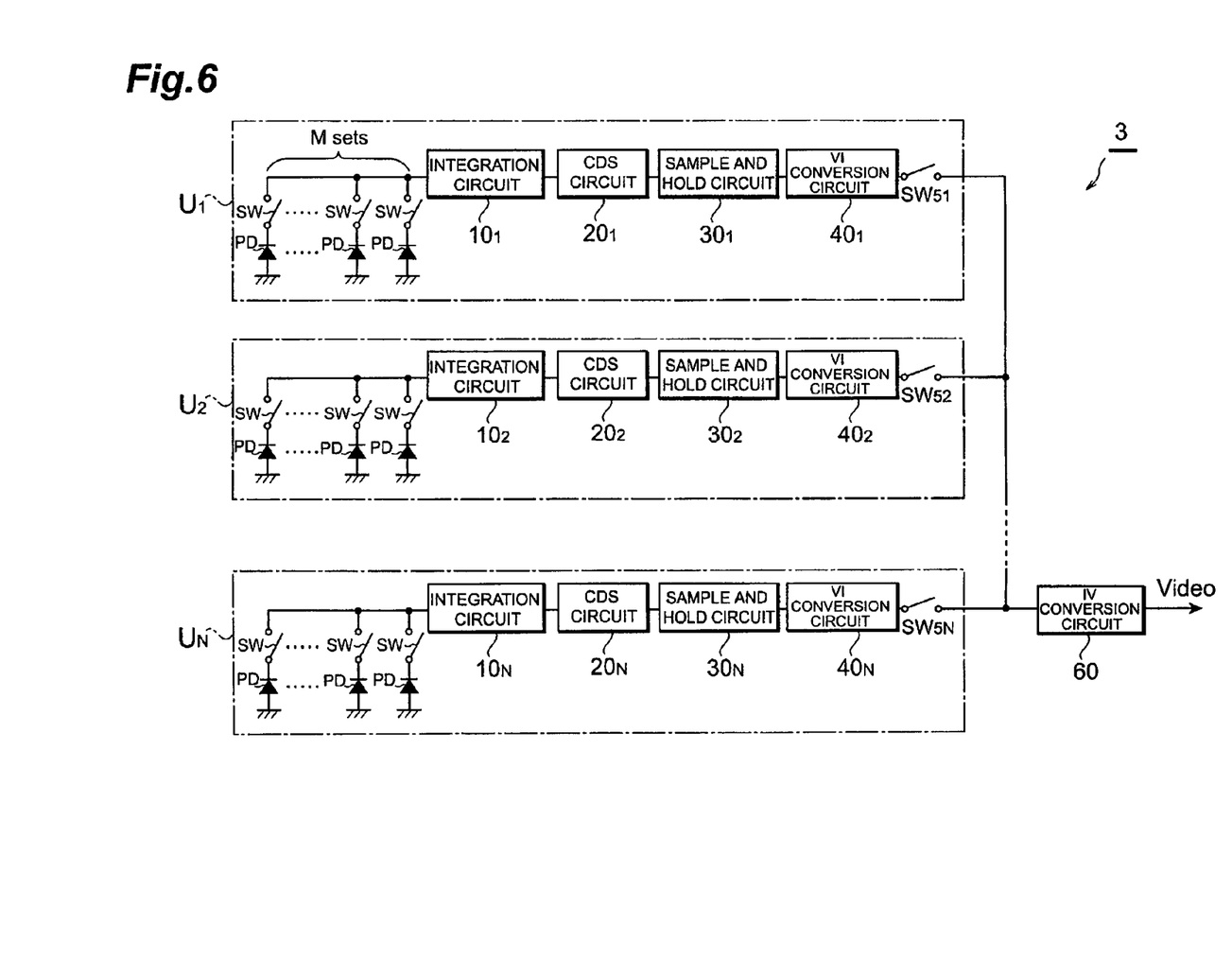
FIG. 6 is a block diagram of a solid-state image pickup device of a third embodiment.

A third embodiment of a solid-state image pickup device by this invention shall now be described. FIG. 6 is a block diagram of solid-state image pickup device 3 of the third embodiment. This solid-state image pickup device 3 has photodiodes PD aligned in two dimensions and is equipped with N (where is an integer of 2 or more) units $U_1$ to $U_N$ and an IV conversion circuit 60. Each unit $U_n$ (where n is an arbitrary integer of no less than 1 and no more than N) includes M sets (where M is an integer of 2 or more) of photodiodes PD and switches, an integrating circuit $10_n$, a CDS circuit $20_n$, a hold circuit $30_n$, a VI conversion circuit $40_n$ and a switch $SW_{5n}$.

With each unit $U_n$, the M sets of photodiodes PD and switches SW, integrating circuit 10, CDS circuit $20_n$, and hold circuit $30_n$ make up a photoelectric conversion circuit that outputs a voltage of a value corresponding to an incident light intensity. The N switches $SW_{51}$ to $SW_{5N}$ make up a selection circuit that successively selects the output terminal of VI conversion circuit $40_n$ of each unit $U_n$ and connects the output terminal to the input terminal of IV conversion circuit 60. Integrating circuit $10_n$, CDS circuit $20_n$, hold circuit $30_n$, and VI conversion circuit $40_n$ of each unit $U_n$ and IV conversion circuit 60 make up a signal processing circuit of this solid-state image pickup device 1.

The specific circuit arrangement examples of each integrating circuit $10_n$, each CDS circuit $20_n$, each hold circuit $30_n$, each VI conversion circuit $40_n$, each switch $SW_{5n}$, and IV conversion circuit 60 are the same as those shown in FIG. 2 or FIG. 4. In comparison to solid-state image pickup device 1 of the first embodiment, solid-state image pickup device 3 of the present embodiment differs in that M sets of photodiodes PD and switches SW are provided in each unit $U_n$ and that the M switches SW of each unit $U_n$ close successively so that the corresponding photodiode PD becomes connected with integrating circuit $10_n$. The switching operations of the M switches SW of each unit $U_n$ are also output at predetermined timings by a control circuit (not shown).

The operations of solid-state image pickup device of this embodiment are substantially the same as the operations described with the timing charts shown in FIG. 3 or FIG. 5. However, with this embodiment, photodiodes PD are aligned in the two dimensions of M rows and N columns and the M switches SW of each unit $U_n$ close successively. Thus with the Video signal output from IV conversion circuit 60, voltages corresponding to the intensities of incident light on N photodiodes PD of the first row appear first in a time sequence, then voltages corresponding to the intensities of incident light on N photodiodes PD of the second row appear in the time sequence, then voltages corresponding to the intensities of incident light on N photodiodes PD of the third row appear in the time sequence, and so for thin likewise manner, voltages corresponding to the intensities of incident light on the respective photodiodes PD appear in the time sequence.

When light of the same intensity is made incident on photodiode PD of each unit $U_n$, the fluctuation of the value of the current output from each VI conversion circuit $40_n$ depends on the fluctuation of the resistance value R of resistor $R_{40}$ of each VI conversion circuit $40_n$ with this embodiment as well. The solid-state image pickup device of the present embodiment can thus also take images of excellent quality at high speed in comparison to those of the prior art. Also, since the influence of the fluctuation of the offset possessed by amp $A_{10}$ of integrating circuit $10_n$ is eliminated by the provision of CDS circuit $20_n$ with the solid-state image pickup device of this embodiment as well, images of excellent quality can be taken for this reason as well.

INDUSTRIAL APPLICABILITY

This invention can be applied to a solid-state image pickup device that takes a one-dimensional or two-dimensional optical image.

What is claimed is:

1. A signal processing circuit comprising:
   a plurality of VI conversion circuits, including each one resistor, converting an input voltage to a current based on the resistance value of said resistor, and outputting this current from an output terminal;
   an IV conversion circuit, inputting, into an input terminal, the current output from said output terminal of said VI conversion circuit, converting this current to a voltage, and outputting this voltage; and
   a selection circuit, successively selecting each of said output terminals of a plurality of said VI conversion circuits and connecting the selected output terminal to said input terminal of said IV conversion circuit,
   wherein said VI conversion circuit comprises:
   an amp, having a first input terminal, a second input terminal, and an output terminal, and inputting said input voltage into said first input terminal and outputting, from said output terminal, a voltage corresponding to the difference in the respective potentials of said first input terminal and said second input terminal;
   a MOS transistor, having a gate terminal, source terminal, and a drain terminal, said gate terminal being connected to said output terminal of said amp;
   a resistor, one end of which is connected to said second input terminal of said amp and to said source terminal of said MOS transistor and the other end of which is connected to a first reference potential; and
   a switch, one end of which is connected to said drain terminal of said MOS transistor and the other end of which is set to a second reference potential;
   and converts said input voltage to a current and outputs this current from said drain terminal of said MOS transistor.

2. A solid-state image pickup device comprising:
   said signal processing circuit according to claim 1; and
   a plurality of photoelectric conversion circuits, outputting a voltage of a value corresponding to an incident light intensity,
   wherein said
   plurality of VI conversion circuits, including each one resistor, converting the voltage output from one of said plurality of photoelectric conversion circuits to a current based on the resistance value of said resistor, and outputting this current from an output terminal.

3. A signal processing circuit as set forth in claim 1, wherein said amp is put in the ON state in a period from a time that is a fixed amount of time prior to the time at which said VI conversion circuit is connected by said selection circuit to said IV conversion circuit to the time at which the connection with said IV conversion circuit is disengaged by said selection circuit and said amp is put in the OFF state in other periods.

* * * * *